United States Patent
Hirose (10) Patent No.: US 12,319,615 B2
(45) Date of Patent: Jun. 3, 2025

(54) FLOAT GLASS SUBSTRATE

(71) Applicant: AGC INC., Tokyo (JP)

(72) Inventor: Motoyuki Hirose, Tokyo (JP)

(73) Assignee: AGC INC., Tokyo (JP)

( * ) Notice: Subject to any disclaimer, the term of this patent is extended or adjusted under 35 U.S.C. 154(b) by 661 days.

(21) Appl. No.: 17/578,650

(22) Filed: Jan. 19, 2022

(65) Prior Publication Data

US 2022/0234939 A1  Jul. 28, 2022

(30) Foreign Application Priority Data

Jan. 22, 2021  (JP) ................................ 2021-008661

(51) Int. Cl.
| | | |
|---|---|---|
| *C03C 3/087* | (2006.01) | |
| *C03C 1/00* | (2006.01) | |
| *C03C 3/091* | (2006.01) | |
| *C03B 5/225* | (2006.01) | |

(52) U.S. Cl.
CPC .............. *C03C 3/087* (2013.01); *C03C 1/004* (2013.01); *C03C 3/091* (2013.01); *C03B 5/2252* (2013.01)

(58) Field of Classification Search
CPC .......... C03C 3/085; C03C 3/087; C03C 3/091
See application file for complete search history.

(56) References Cited

U.S. PATENT DOCUMENTS

| | | | |
|---|---|---|---|
| 2002/0023463 A1* | 2/2002 | Siebers | .................. C03C 3/085 |
| | | | 501/63 |
| 2015/0045201 A1* | 2/2015 | Tokunaga | ............... C03C 3/087 |
| | | | 501/59 |
| 2018/0141857 A1* | 5/2018 | Sakurabayashi | ...... C03B 17/064 |
| 2020/0299180 A1 | 9/2020 | Hirose et al. | |
| 2021/0380468 A1 | 12/2021 | Mushiake et al. | |

FOREIGN PATENT DOCUMENTS

| | | |
|---|---|---|
| CN | 111718119 A | 9/2020 |
| JP | 4613635 B2 | 1/2011 |
| JP | 2016-84242 A | 5/2016 |
| WO | WO 2011/078258 A1 | 6/2011 |
| WO | WO 2013/161903 A1 | 10/2013 |
| WO | WO 2016/002814 A1 | 1/2016 |
| WO | WO 2016/185863 A1 | 11/2016 |
| WO | WO 2016/208451 A1 | 12/2016 |
| WO | WO 2019/102895 A1 | 5/2019 |
| WO | WO 2020/071193 A1 | 4/2020 |

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The present invention relates to a float glass substrate including an alkali-free glass, the float glass substrate having a Cl content of from 0.10 to 0.50 mass %, containing substantially no $SnO_2$, and having a Pt content of, by mass, from 0.001 to 0.30 ppm. The float glass substrate may have a Rh content of, by mass, from 0.001 to 0.50 ppm.

11 Claims, 3 Drawing Sheets

FLOAT GLASS SUBSTRATE

TECHNICAL FIELD

The present invention relates to a float glass substrate.

BACKGROUND ART

As a glass substrate for various displays, particularly, when a metal or oxide thin film, etc. is formed on its surface, an alkali-free glass substrate containing substantially no alkali metal ions is preferably used, because if the substrate contains an alkali metal oxide, alkali metal ions diffuse into the thin film and deteriorate the film properties.

The alkali-free glass substrate used for the purpose above is obtained by heating and melting glass raw materials mixed at a predetermined blending ratio in a melting furnace to effect vitrification, refining the obtained molten glass, subsequently forming a glass ribbon having a predetermined plate thickness in a float bath, and cutting the glass ribbon into a predetermined shape. Here, a molten glass-conveying pipe made of platinum (Pt) or a platinum alloy such as platinum (Pt)-rhodium (Rh) alloy, which has excellent heat resistance and corrosion resistance to molten glass, is provided between the melting furnace and the float bath.

Conventionally, in order to enhance the quality of the glass product formed, a refining step of removing bubbles generated in molten glass is utilized before molten glass obtained by melting glass raw materials in a melting furnace is formed in a forming apparatus. In the refining step, there is known a method where a refining agent is preliminarily added into glass raw materials, molten glass obtained by melting the glass raw materials is stored and held at a predetermined temperature for a given time, and bubbles in the molten glass are allowed to grow and float up with the aid of the refining agent and removed.

Also, there is known a vacuum refining method where molten glass is introduced into a reduced-pressure atmosphere, bubbles in the continuously flowing molten glass flow are allowed to grow large under the reduced-pressure atmosphere, and the bubbles contained in the molten glass are thereby caused to float up, burst and be removed and then molten glass are discharged from the reduced-pressure atmosphere.

In order to efficiently remove bubbles from the molten glass, it is preferable to carry out two methods above in combination, that is, to carry out the vacuum refining method using molten glass in which a refining agent is added.

As the refining agent of the glass, a sulfate-based refining agent such as $CaSO_4$ and $BaSO_4$, and an oxide-based refining agent such as $As_2O_3$, $Sb_2O_3$ and $SnO_2$ exist. Among these, in the case of an alkali-free glass having low basicity, the sulfate-based refining agent is insufficient in the effect of removing bubbles from molten glass because of low solubility of $SO_4^{2-}$. In addition, $As_2O_3$ and $Sb_2O_3$, particularly $As_2O_3$, have a large environmental impact and therefore, it is desired to reduce use thereof. Also, when a tin compound-based refining agent such as $SnO_2$ is used, this poses a problem that a float glass substrate is colored. For this reason, use of the tin compound-based refining agent is not appropriate for the manufacture of a float glass substrate.

Patent Literature 1 discloses that a chloride-based refining agent such as $BaCl_2$, $SrCl_2$, $CaCl_2$, $MgCl_2$, $AlCl_3$ and $NH_4Cl$ exerts an excellent effect as a refining agent combined with vacuum refining. Furthermore, an alkali metal chloride such as NaCl is disclosed as the chloride-based refining agent.

[Patent Literature 1] International Publication WO2011/078258

SUMMARY OF INVENTION

In order to efficiently remove bubbles contained in molten glass, it is preferable to increase the amount used of a chloride-based refining agent. However, it became clear that when the amount used of a chloride-based refining agent is increased, the percentage of defective products derived from metal foreign object defects increases in the inspection step and the productivity of a float glass substrate decreases.

The present invention has been made taking into account the above-described problem and aims at providing a float glass substrate ensuring that bubbles contained in molten glass can be easily removed and the number of metal foreign object defects is small.

The float glass substrate of the present invention is a float glass substrate including an alkali-free glass, the float glass substrate having a Cl content of from 0.10 to 0.50 mass %, containing substantially no $SnO_2$, and having a Pt content of, by mass, from 0.001 to 0.30 ppm.

The float glass substrate of the present invention ensures that bubbles contained in molten glass can be easily removed and the number of metal foreign object defects is small.

DESCRIPTION OF EMBODIMENTS

[Float Glass Substrate]

The float glass substrate of the present invention is described below.

The float glass substrate of the present invention includes an alkali-free glass. The alkali-free glass refers to a glass containing substantially no alkali metal oxide such as $Na_2O$ and $K_2O$. Here, containing substantially no alkali metal oxide means that the total of contents of alkali metal oxides is 0.1 mass % or less.

In the float glass substrate of the present invention, the Cl content is from 0.10 to 0.50 mass %. Cl in the glass is a component derived from a chloride-based refining agent. If the Cl content is less than 0.10 mass %, the refining action exhibited by the chloride-based refining agent tends to be insufficient. This may result in insufficient removal of bubbles contained in molten glass. If the Cl content is more than 0.50 mass %, Pt is readily eluted from the molten glass-conveying pipe into molten glass, and the Pt ion content of the molten glass increases.

The inventors of the present invention have analyzed metal foreign object defects of the float glass substrate and found that the component thereof is mainly Pt. The Pt eluted from the molten glass-conveying pipe into molten glass is present as Pt ion in the molten glass. The molten glass is formed into a glass ribbon in a float bath. Then, under a reducing atmosphere in the float bath, Pt ions present in the glass ribbon are reduced, and Pt precipitates on a glass ribbon surface and becomes a metal foreign object defect of the float glass substrate.

When the Cl content is from 0.10 to 0.50 mass %, bubbles contained in molten glass can be sufficiently removed, and elution of Pt from the molten glass-conveying pipe into molten glass can be suppressed.

The float glass substrate of the present invention contains substantially no $SnO_2$. $SnO_2$ is a tin compound-based refining agent. The manufacturing method of a float glass substrate of the present invention does not use a tin compound-based refining agent and therefore, the float glass substrate is not colored. Here, containing substantially no $SnO_2$ means that a content of $SnO_2$ is less than 0.05 mass %.

In the float glass substrate of the present invention, the Pt content is, by mass, from 0.001 to 0.30 ppm. As described above, a molten glass-conveying pipe made of platinum (Pt) or a platinum alloy is provided between the melting furnace and the float bath. Therefore, Pt is unavoidably eluted from the molten glass-conveying pipe into molten glass, and the float glass substrate contains, by mass, 0.001 ppm or more of Pt.

If the Pt content of the float glass substrate increases, the number of metal foreign object defects increases, and the percentage of defective products derived from metal foreign object defects increases in the inspection step. When the Pt content is, by mass, 0.30 ppm or less, the percentage of defective products derived from metal foreign object defects does not increase in the inspection step. In the float glass substrate of the present invention, the Pt content is, by mass, preferably from 0.001 to 0.25 ppm, more preferably from 0.001 to 0.20 ppm, still more preferably from 0.001 to 0.15 ppm.

In the float glass substrate of the present invention, the Rh content is, by mass, preferably from 0.001 to 0.50 ppm.

In the case where the molten glass-conveying pipe provided between the melting furnace and the float bath is made of a platinum alloy, a Pt—Rh alloy is usually used. In this case, Rh is eluted together with Pt from the molten glass-conveying pipe into molten glass, and the float glass substrate contains, by mass, 0.001 ppm or more of Rh.

If the Rh content of the float glass substrate increases, the number of metal foreign object defects increases as well, and the percentage of defective products derived from metal foreign object defects may increase in the inspection step. When the Rh content is, by mass, 0.50 ppm or less, the percentage of defective products derived from metal foreign object defects does not increase in the inspection step. In the float glass substrate of the present invention, the Rh content is, by mass, preferably from 0.001 to 0.40 ppm, more preferably from 0.001 to 0.30 ppm, still more preferably from 0.001 to 0.25 ppm.

In the float glass substrate of the present invention, the total content of the Pt content and the Rh content is, by mass, preferably from 0.002 to 0.80 ppm, more preferably from 0.002 to 0.65 ppm, still more preferably from 0.002 to 0.50 ppm, yet still more preferably from 0.002 to 0.25 ppm.

A β-OH is used as an index of the water content in the glass. In the float glass substrate of the present invention, when the Cl content is more than 0.35 mass % and 0.50 mass % or less, the β-OH is preferably from 0.05 to 0.20 $mm^{-1}$. When the β-OH is 0.05 $mm^{-1}$ or more, water in the glass flows into bubbles contained in molten glass under a reduced-pressure atmosphere to facilitate growth of bubbles.

The β-OH is more preferably 0.07 $mm^{-1}$ or more, still more preferably 0.09 $mm^{-1}$ or more. When the β-OH is 0.20 $mm^{-1}$ or less, excessive growth of bubbles can be suppressed, so that passing-through of bubbles during vacuum refining due to overgrowth of a bubble layer can be prevented. The β-OH is more preferably 0.18 $mm^{-1}$ or less, still more preferably 0.16 $mm^{-1}$ or less.

Also, when the β-OH of the float glass substrate is from 0.05 to 0.20 $mm^{-1}$, the water content in the glass is small, so that a strain point of the glass substrate can be raised and in turn, the thermal shrinkage rate of the float glass substrate can be lowered. In order to lower the β-OH, there are a method of selecting glass raw materials having a small water content, a method of melting glass raw materials by energization heating of electrodes, etc.

In the float glass substrate of the present invention, when the Cl content is from 0.10 to 0.35 mass %, the β-OH is preferably from 0.20 to 0.50 $mm^{-1}$. When the β-OH is 0.20 $mm^{-1}$ or more, water in the glass flows into bubbles contained in the molten glass under a reduced-pressure atmosphere to facilitate growth of the bubbles. The β-OH is preferably 0.25 $mm^{-1}$ or more. When the β-OH is 0.50 $mm^{-1}$ or less, excessive growth of bubbles can be suppressed, so that passing-through of bubbles during vacuum refining due to overgrowth of a bubble layer can be prevented. The β-OH is more preferably 0.45 $mm^{-1}$ or less, still more preferably 0.40 $mm^{-1}$ or less.

The β-OH can be determined according to the following formula by measuring the transmittance of the float glass substrate by use of a Fourier transform infrared spectrophotometer (FT-IR):

$$\beta\text{-OH}=(1/X)\log_{10}(T_1/T_2)$$

X: plate thickness (mm) of float glass substrate
$T_1$: transmittance (%) at reference wavenumber of 4,000 $cm^{-1}$
$T_2$: minimum transmittance (%) around hydroxyl group absorption wavenumber of 3,570 $cm^{-1}$ As long as the float glass substrate includes an alkali-free glass and contains substantially no $SnO_2$ and the Cl content and Pt content satisfy the above-described ranges, the float glass substrate of the present invention can be appropriately selected from a wide range of compositions. Specific examples of the composition of the float glass substrate of the present invention are described below.

In one specific example, the composition of the float glass substrate of the present invention includes, as represented by mass % based on oxides, $SiO_2$: from 54 to 73%, $Al_2O_3$: from 10.5 to 24%, $B_2O_3$: from 0.1 to 12%, MgO: from 0 to 8%, CaO: from 0 to 14.5%, SrO: from 0 to 24%, BaO: from 0 to 13.5%, and $ZrO_2$: from 0 to 5%, provided that MgO+CaO+SrO+BaO: from 8 to 29.5%.

Hereinafter, in the present description, the mass % based on oxides is simply referred to as "%".

In another specific example, in the case of achieving both a high strain point and a high solubility, the float glass substrate of the present invention preferably includes, as represented by mass % based on oxides, $SiO_2$: from 58 to 66%, $Al_2O_3$: from 15 to 22%, $B_2O_3$: from 5 to 12%, MgO: from 0 to 8%, CaO: from 0 to 9%, SrO: from 0 to 12.5%, and BaO: from 0 to 2%, provided that MgO+CaO+SrO+BaO: from 9 to 18%.

In another specific example, in the case of intending to achieve particularly a high strain point, the float glass substrate of the present invention preferably includes, as represented by mass % based on oxides, $SiO_2$: from 54 to 73%, $Al_2O_3$: from 10.5 to 22.5%, $B_2O_3$: from 0.1 to 5.5%, MgO: from 0 to 8%, CaO: from 0 to 9%, SrO: from 0 to 16%, and BaO: from 0 to 9%, provided that MgO+CaO+SrO+BaO: from 8 to 26%.

In the float glass substrate of the present invention, when the strain point is 650° C. or more, the thermal shrinkage rate of the float glass substrate can be lowered. This is advantageous in that at the time of manufacturing a liquid crystal panel by using the float glass substrate of the present invention as a glass substrate for a liquid crystal display (LCD), thermal shrinkage can be suppressed. The strain point of the float glass substrate is more preferably 670° C. or more, still more preferably 680° C. or more.

The upper limit of the strain point is not particularly limited, but when the strain point is 700° C. or less, the temperature in the float bath as well as at the outlet of the float bath need not be raised so much, and a glass ribbon in the float bath can be easily formed. In addition, the life of a metal member in the float bath is advantageously little affected.

The float glass substrate of the present invention preferably has a substrate size of a short side of 2,100 mm or more and a long side of 2,400 mm or more, more preferably a short side of 2,800 mm or more and a long side of 3,000 mm or more, still more preferably a short side of 2,900 mm or more and a long side of 3,200 mm or more.

In using the float glass substrate of the present invention as a glass substrate for a flat panel display (FPD), a glass substrate for a magnetic disc, a support substrate for a semiconductor package, etc., the plate thickness is preferably 0.75 mm or less, more preferably 0.55 mm or less, still more preferably 0.45 mm or less.

[Manufacturing Method of Float Glass Substrate]

Figure 1:
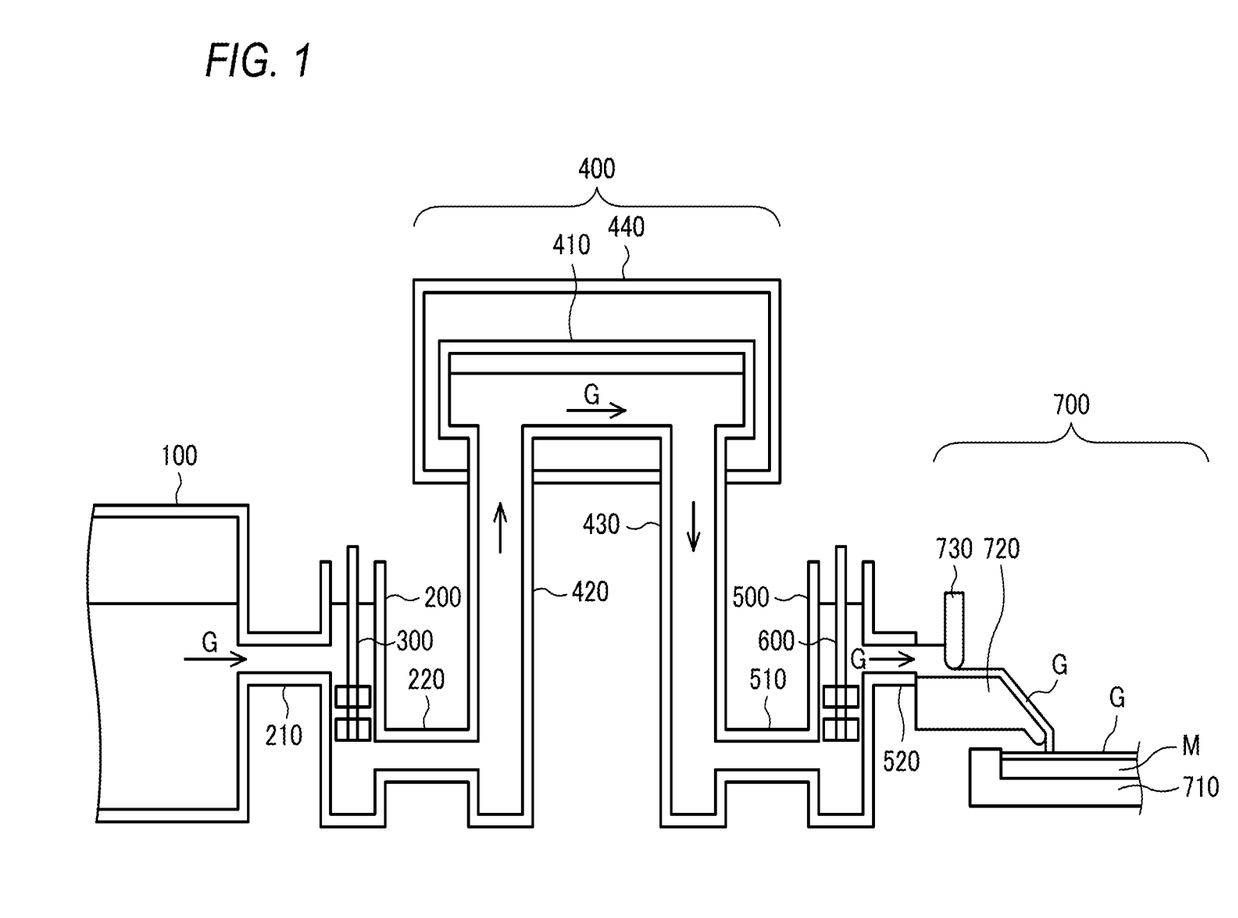
FIG. 1 is a cross-sectional diagram illustrating one configuration example of the glass manufacturing apparatus used for the manufacture of the float glass substrate of the present invention.

Next, the manufacturing method of the float glass substrate of the present invention is described using a drawing. FIG. 1 is a cross-sectional diagram illustrating one configuration example of the glass manufacturing apparatus used for the manufacture of the float glass substrate of the present invention.

The glass manufacturing apparatus illustrated in FIG. 1 includes a melting furnace 100, a vacuum refining apparatus 400, and a forming apparatus 700.

Between the melting furnace 100 and the vacuum refining apparatus 400, an upstream horizontal pipe 210, an upstream vertical pipe 200, and an upstream horizontal pipe 220 are provided and connect the melting furnace 100 with the vacuum refining apparatus 400.

Between the vacuum refining apparatus 400 and the forming apparatus 700, a downstream horizontal pipe 510, a downstream vertical pipe 500, and a downstream horizontal pipe 520 are provided and connect the vacuum refining apparatus 400 with the forming apparatus 700.

The vacuum refining apparatus 400 includes a vacuum refining vessel 410, an uprising pipe 420, a downfalling pipe 430, and a vacuum housing 440.

The vacuum refining vessel 410 is housed and disposed in the vacuum housing 440 such that its longitudinal axis extends in the horizontal direction. The uprising pipe 420 extending in the vertical direction is attached to a bottom surface at one end of the vacuum refining vessel 410, and the downfalling pipe 430 is attached to the bottom surface at the other end thereof. Parts of the uprising pipe 420 and the downfalling pipe 430 are located inside the vacuum housing 440.

The upstream horizontal pipe 210 and the upstream horizontal pipe 220 are provided such that molten glass G conveyed from the melting furnace 100 flows in from the upper lateral side of the upstream vertical pipe 200, flows downward in the upstream vertical pipe 200, and flows out to the lower lateral side of the upstream vertical pipe 200. A stirrer 300 for stirring the molten glass G is provided inside the upstream vertical pipe 200. The upstream horizontal pipe 220 is connected to the uprising pipe 420 and conveys the molten glass G to the vacuum refining apparatus 400.

The downstream horizontal pipe 510 and the downstream horizontal pipe 520 are provided such that molten glass G conveyed from the vacuum refining apparatus 400 flows in from the lower lateral side of the downstream vertical pipe 500, flows upward in the downstream vertical pipe 500, and flows out to the upper lateral side of the downstream vertical pipe 500. The downstream horizontal pipe 510 is connected to the downfalling pipe 430 and the molten glass G is conveyed from the vacuum refining apparatus 400. A stirrer 600 for stirring the molten glass G is provided inside the downstream vertical pipe 500.

The downstream horizontal pipe 520 is connected to a lip 720 of the forming apparatus 700 and conveys the molten glass G to the forming apparatus 700. In the forming apparatus 700, a float bath is used so as to obtain a float glass substrate. The float bath includes a bathtub 710 for storing a molten metal M, a lip 720, and a tweel 730 for adjusting the flow rate of the molten glass G flowing on the lip 720. As the distance between the lip 720 and the tweel 730 is larger, the flow rate of the molten glass G increases. The float bath is an apparatus where the molten glass G is continuously supplied to a bath surface of the molten metal M in the bathtub 710 and formed into a band-shaped glass ribbon. A molten tin or a molten tin alloy, etc. is used as the molten metal M.

In the glass manufacturing apparatus illustrated in FIG. 1, the molten glass G is conveyed in sequence through the upstream horizontal pipe 210, the upstream vertical pipe 200, the upstream horizontal pipe 220, the uprising pipe 420, the vacuum refining vessel 410, the downfalling pipe 430, the downstream horizontal pipe 510, the downstream vertical pipe 500, and the downstream horizontal pipe 520. These members correspond to the molten glass-conveying pipe and are cylindrical and made of platinum (Pt) or a platinum alloy such as Pt—Rh alloy.

Also, the stirrer 300 and the stirrer 600 are made of platinum (Pt) or a platinum alloy such as Pt—Rh alloy.

Incidentally, the vacuum refining vessel 410 may be elliptically cylindrical. In addition, the upstream horizontal pipe 210, the upstream horizontal pipe 220, the downstream horizontal pipe 510, or the downstream horizontal pipe 520 may be an oblique pipe inclined with respect to the horizontal plane.

In the manufacturing method of the float glass substrate, glass raw materials are melted in the melting furnace 100 to produce molten glass G, and the molten glass G is subjected to a vacuum refining treatment in the vacuum refining apparatus 400 and formed into a band-shaped glass ribbon in the forming apparatus 700. Then, the glass ribbon is annealed in an annealing apparatus (not shown) and after inspecting the glass ribbon for bubble defects or foreign object defects, the glass ribbon is cut using a processing apparatus to obtain a float glass substrate.

In the case where the float glass substrate is used as a glass substrate for a flat panel display (FPD), the float glass substrate is further subjected in sequence to cut-folding, chamfering and polishing. After the polishing, the float glass substrate is inspected for bubble defects or foreign object defects. In the polishing, at least one of both main surfaces of the float glass substrate is polished to remove minute irregularities or undulations present in the main surface of the float glass substrate.

The melting furnace 100 includes burners for melting glass raw materials supplied. The burners form flames by mixing fuel such as natural gas and heavy oil, with a gas and burning the mixture. A burner that mainly uses air as the gas is called an air combustion burner, and a burner that mainly uses oxygen as the gas is called an oxygen combustion burner. The burners emit flames toward the glass raw materials and thereby heat the glass raw materials from above. The melting furnace 100 may be provided with electrodes for heating the glass raw materials.

As the glass raw materials, for example, silica sand, boric acid, limestone, aluminum oxide, strontium carbonate, magnesium oxide, etc. can be used and mixed to give an alkali-free glass composition of the intended float glass substrate.

A chloride-based refining agent is added to the glass raw materials. From the viewpoint of no probability of occurrence of deliquescence, the chloride-based refining agent is preferably $BaCl_2 \cdot 2H_2O$, $SrCl_2 \cdot 6H_2O$, $CaCl_2$), $MgCl_2 \cdot 6H_2O$ or $NH_4Cl$.

The chloride-based refining agent is added such that the Cl content in the float glass substrate manufactured becomes from 0.10 to 0.50 mass %.

In the manufacturing method of the float glass substrate, the molten glass G supplied from the melting furnace 100 is subjected to vacuum refining in the vacuum refining vessel 410 in which the pressure is reduced to a predetermined pressure. The molten glass G is preferably continuously supplied to and discharged from the vacuum refining vessel 410.

The vacuum refining vessel 410 is preferably heated such that the inside temperature becomes from 1,200 to 1,600° C., particularly from 1,350 to 1,550° C., in order for the chloride-based refining agent to exhibit sufficient refining action.

At the time of conducting the vacuum refining, the air inside the vacuum housing 440 is externally exhausted through a suction opening portion formed at a predetermined position of the vacuum housing 440 by a vacuum pressure-reducing means such as vacuum pump. Consequently, the air inside the vacuum refining vessel 410 housed in the vacuum housing 440 is exhausted indirectly, and the pressure inside the vacuum refining vessel 410 is reduced to a predetermined pressure.

The pressure inside the vacuum refining vessel 410 is preferably from 13.33 kPa to 53.33 kPa.

Incidentally, the refining step in the manufacturing method of the float glass substrate is not limited to vacuum refining, and high-temperature refining of heating molten glass at a high temperature (for example, more than 1,600° C.) and thereby promoting the refining action may also be employed.

In the manufacturing method of the float glass substrate, elution of Pt or Rh from the molten glass-conveying pipe into the molten glass can be reduced by the following methods (1) to (4).

(1) As demonstrated in Exs. 1 to 6 described below, the higher the molten glass temperature (hereinafter, sometimes referred to as "glass temperature") is, the larger the elution amount of Pt or Rh is. Therefore, the elution amount of Pt or Rh can be decreased by lowering the temperature of molten glass passing through the molten glass-conveying pipe.

(2) As demonstrated in Exs. 1 to 6 described below, the larger the Cl content of the float glass substrate is, the larger the elution amount of Pt or Rh is. Therefore, the elution amount of Pt or Rh can be decreased by reducing the Cl content of the float glass substrate.

(3) When the flow rate of molten glass passing through the molten glass-conveying pipe is increased, the contact time between the molten glass and the molten glass-conveying pipe can be reduced, and the elution amount of Pt or Rh can thereby be decreased.

(4) When the ratio of surface area to volume of the molten glass-conveying pipe is reduced, the contact area between the molten glass and the molten glass-conveying pipe can be reduced, and the elution amount of Pt or Rh can thereby be decreased.

On the other hand, all of the methods by (1) to (3) above for decreasing the elution amount of Pt or Rh are disadvantageous in view of removing bubbles contained in molten glass. As for (3) above, the method is disadvantageous because when the flow rate of molten glass is increased, the residence time of molten glass passing through the vacuum refining vessel decreases. Also, the methods by (3) and (4) above for decreasing the elution amount of Pt or Rh are disadvantageous in the case of performing small-quantity production of a float glass substrate. As for (4) above, the method is disadvantageous because when the ratio of surface area to volume of the molten glass-conveying pipe is reduced, the diameter of the molten glass-conveying pipe increases.

Accordingly, the methods by (1) to (4) above for decreasing the elution amount of Pt or Rh need to be conducted considering the viewpoint of removing bubbles contained in molten glass as well as taking into account the production of the float glass substrate.

In (3) above, the flow rate of molten glass (hereinafter, sometimes referred to as "glass flow rate") is preferably from 0.03 $m^3/h$ to 1.5 $m^3/h$.

In (4) above, the ratio of surface area to volume of the molten glass-conveying pipe (hereinafter, sometimes written as "surface area/volume") is preferably from 0.03 $cm^{-1}$ to 0.3 $cm^{-1}$, more preferably from 0.03 $cm^{-1}$ to 0.2 $cm^{-1}$.

EXAMPLES

The present invention is described in greater detail below by referring to Examples, but the present invention is not limited to these Examples.

Experiment Example 1

Exs. 1 to 6

Based on an alkali-free glass having a composition of, as represented by mass % based on oxides, $SiO_2$: 59.8%, $Al_2O_3$: 17.2%, $B_2O_3$: 7.8%, MgO: 3.1%, CaO: 4.1%, SrO: 7.7%, BaO: 0.1%, and Cl: 0.20%, glass raw materials mixed such that only the Cl content becomes 0.00 to 0.30% were prepared. These were melted in an electric furnace by using an alumina crucible to prepare glass samples. The glasses obtained were subjected to heat treatment at 1,400° C. or 1,500° C. for 1 hour in a platinum alloy-made crucible having an Rh content of 10 at %. The contents of Pt and Rh contained in the glass after the heat treatment were quantitatively evaluated by ICP-MS (inductively coupled plasma mass spectrometry) method, and the dissolution rates of Pt and Rh per unit area·unit time were calculated from the contact area between molten glass and crucible and the heat treatment time.

Figure 2:
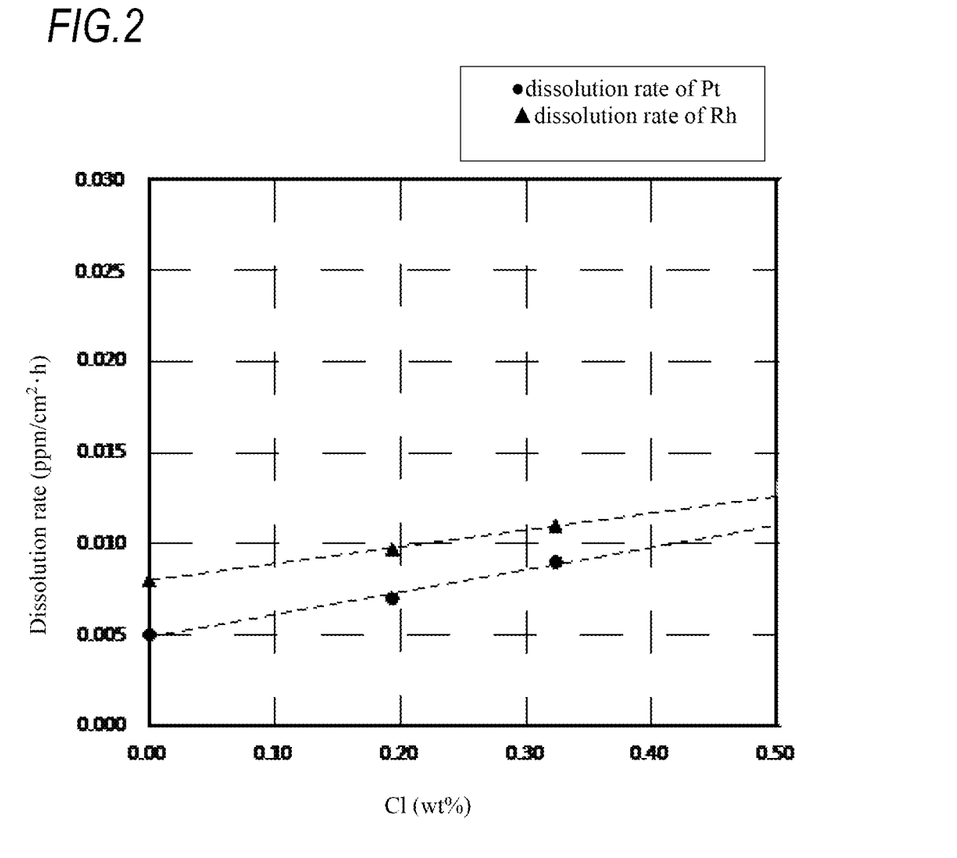
FIG. 2 is a graph illustrating the relationship between the Cl content of the float glass substrate and the dissolution rates of Pt and Rh in Exs. 1 to 3 where molten glass was subjected to heat treatment at 1,400° C. for 1 hour.
Figure 3:
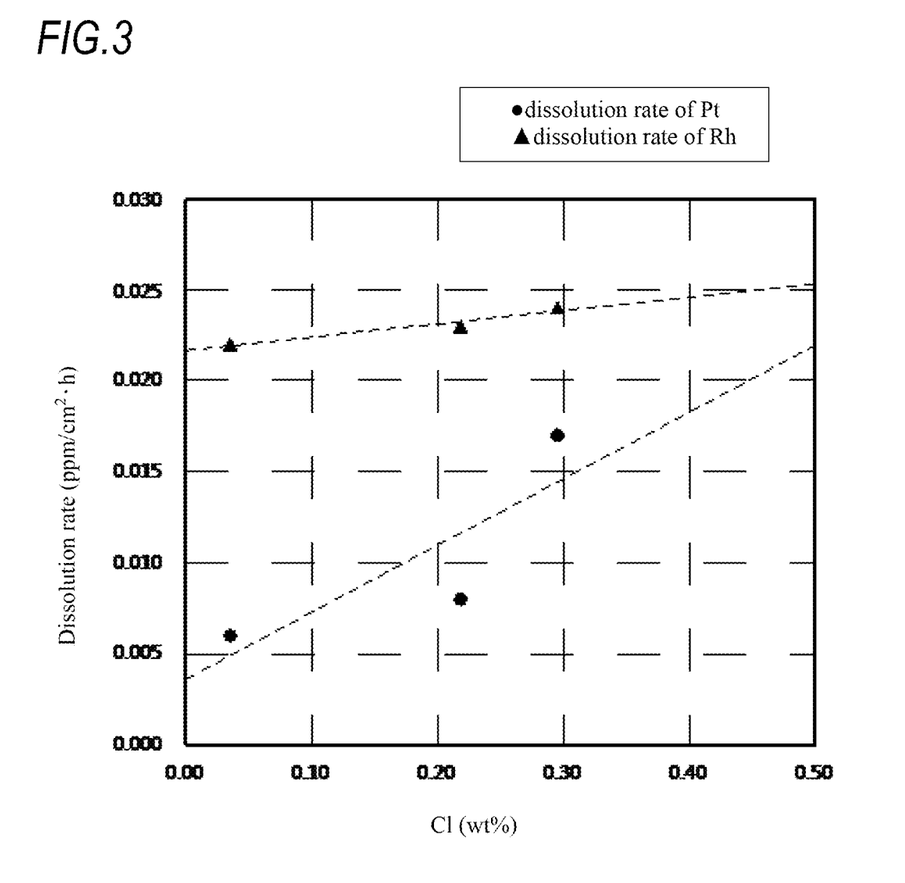
FIG. 3 is a graph illustrating the relationship between the Cl content of the float glass substrate and the dissolution rates of Pt and Rh in Exs. 4 to 6 where molten glass was subjected to heat treatment at 1,500° C. for 1 hour.

The results are shown in Table 1 below and FIGS. 2 and 3. FIG. 2 is a graph illustrating the relationship between the Cl content of the float glass substrate and the dissolution rates of Pt and Rh in Exs. 1 to 3 where molten glass was subjected to heat treatment at 1,400° C. for 1 hour. FIG. 3 is a graph illustrating the relationship between the Cl content of the float glass substrate and the dissolution rates of Pt and Rh in Exs. 4 to 6 where molten glass was subjected to heat treatment at 1,500° C. for 1 hour. In FIGS. 2 and 3, the dashed lines are regression lines.

TABLE 1

|  |  | Ex. 1 | Ex. 2 | Ex. 3 | Ex. 4 | Ex. 5 | Ex. 6 |
|---|---|---|---|---|---|---|---|
| Cl Content | (wt %) | 0.00 | 0.19 | 0.32 | 0.04 | 0.22 | 0.30 |
| Melting temperature | (° C.) | 1400 | 1400 | 1400 | 1500 | 1500 | 1500 |
| Pt Dissolution rate | (ppm/cm$^2$ · h) | 0.005 | 0.007 | 0.009 | 0.006 | 0.008 | 0.017 |
| Rh Dissolution rate | (ppm/cm$^2$ · h) | 0.008 | 0.010 | 0.011 | 0.022 | 0.023 | 0.024 |

It is seen from these results that when the Cl content is increased, the dissolution rates of Pt and Rh rise. Also, as the temperature of the molten glass is higher, the dissolution rates of Pt and Rh increase. Particularly, in the case where the temperature of the molten glass is 1,500° C., the dissolution rate of Pt has a significant tendency to rise when the Cl content is increased.

Experiment Example 2

Exs. 7 to 19

Based on the results of Experiment Example 1, the float glass substrate manufactured by the glass manufacturing apparatus illustrated in FIG. 1 was evaluated for the metal foreign object quality and the bubble quality by simulation. Exs. 7, 8 and 13 are Comparative Examples, and Exs. 9 to 12 and 14 to 19 are Examples.

In the glass manufacturing apparatus illustrated in FIG. 1, the upstream horizontal pipe 210, the upstream vertical pipe 200, the upstream horizontal pipe 220, the uprising pipe 420, the vacuum refining vessel 410, the downfalling pipe 430, the downstream horizontal pipe 510, the downstream vertical pipe 500, the downstream horizontal pipe 520, the stirrer 300, and the stirrer 600 were made of a platinum alloy having an Rh content of 10 at %. The glass composition (excluding the Cl content) of molten glass passing through the glass manufacturing apparatus was the same among Exs. 1 to 6.

The Pt content shown in Tables 2 and 3 below is a value calculated using the regression equation shown in FIG. 2 or FIG. 3 and the Cl content, molten glass-conveying pipe surface area and glass flow rate shown in Tables 2 and 3 below. The Rh content shown in Tables 2 and 3 below was calculated by the same method.

The bubble growth index I shown in Tables 2 and 3 below is an index indicating how easily bubbles contained in molten glass grow in a reduced-pressure atmosphere. As the bubble growth index I is higher, bubbles contained in molten glass are more likely to grow. The bubble growth index I was calculated according to the following formula (1):

$$I = 590.5 \times [\beta\text{-OH}] + 874.1 \times [\text{Cl}] - 5.7 \times [B_2O_3] - 33.3 \quad (1)$$

In formula (1), [β-OH] represents the β-OH (mm$^{-1}$) of the float glass substrate, [Cl] represents the Cl content (mass %) of the float glass substrate, and [B$_2$O$_3$] represents the B$_2$O$_3$ content (mass %) of the float glass substrate.

The metal foreign object quality and bubble quality shown in Tables 2 and 3 were judged "A" or "B" according to the criteria below. When the metal foreign object quality and bubble quality were judged "A", it is assumed that the percentage of defective products derived from metal foreign object defects and bubble defects is decreased and the productivity of the float glass substrate is enhanced.

When the Pt content is 0.30 ppm or less, the metal foreign object quality was judged "A", and when the Pt content is more than 0.30 ppm, the metal foreign object quality was judged "B".

In the case of Exs. 7 to 9 and 12 to 18 where the glass temperature is 1,500° C., when the bubble growth index 1 is more than 320, the bubble quality was judged "A", and when the bubble growth index I is 320 or less, the bubble quality was judged "B". Also, in the case of Exs. 10, 11 and 19 where the glass temperature is 1,400° C., compared with the case where the glass temperature is 1,500° C., it is not easy to remove bubbles contained in molten glass, and therefore, when the bubble growth index I is more than 400, the bubble quality was judged

TABLE 2

|  |  | Ex. 7 | Ex. 8 | Ex. 9 | Ex. 10 | Ex. 11 | Ex. 12 | Ex. 13 |
|---|---|---|---|---|---|---|---|---|
| Molten glass-conveying pipe surface area | (cm$^2$) | 57073 | 57073 | 57073 | 57073 | 43429 | 40477 | 57073 |
| Molten glass-conveying pipe volume | (cm$^3$) | 367181 | 367181 | 367181 | 367181 | 367181 | 367181 | 367181 |
| Glass flow rate | (m$^3$/h) | 0.02 | 0.02 | 0.04 | 0.04 | 0.04 | 0.04 | 0.04 |
| Glass temperature | (° C.) | 1500 | 1500 | 1500 | 1400 | 1400 | 1500 | 1500 |
| Cl Content | (wt %) | 0.00 | 0.26 | 0.18 | 0.30 | 0.32 | 0.26 | 0.30 |
| β-OH | (mm$^{-1}$) | 0.40 | 0.30 | 0.42 | 0.37 | 0.35 | 0.30 | 0.25 |
| Pt Content | (Ppm) | 0.17 | 0.60 | 0.23 | 0.20 | 0.15 | 0.21 | 0.33 |
| Rh Content | (Ppm) | 0.99 | 1.08 | 0.52 | 0.25 | 0.19 | 0.38 | 0.54 |
| Pt + Rh Content | (ppm) | 1.16 | 1.68 | 0.76 | 0.44 | 0.34 | 0.59 | 0.88 |
| Surface area/volume | (cm$^{-1}$) | 0.16 | 0.16 | 0.16 | 0.16 | 0.12 | 0.11 | 0.16 |
| Bubble growth index I |  | 157 | 326 | 326 | 402 | 407 | 326 | 331 |

TABLE 2-continued

|  | Ex. 7 | Ex. 8 | Ex. 9 | Ex. 10 | Ex. 11 | Ex. 12 | Ex. 13 |
|---|---|---|---|---|---|---|---|
| Metal foreign object quality | A | B | A | A | A | A | B |
| Bubble quality | B | A | A | A | A | A | A |

The Cl content, Pt content and Rh content in Tables 2 and 3 are a content in the float glass substrate. Also, the surface area/volume in Tables 2 and 3 is a value obtained by dividing the surface area of the molten glass-conveying pipe by the volume of the molten glass-conveying pipe.

TABLE 3

|  |  | Ex. 14 | Ex. 15 | Ex. 16 | Ex. 17 | Ex. 18 | Ex. 19 |
|---|---|---|---|---|---|---|---|
| Molten glass-conveying pipe surface area | (cm$^2$) | 272907 | 272907 | 272907 | 272907 | 272907 | 272907 |
| Molten glass-conveying pipe volume | (cm$^3$) | 3746349 | 3746349 | 3746349 | 3746349 | 3746349 | 3746349 |
| Glass flow rate | (m$^3$/h) | 0.65 | 0.65 | 0.65 | 0.65 | 0.65 | 0.65 |
| Glass temperature | (° C.) | 1500 | 1500 | 1500 | 1500 | 1500 | 1400 |
| Cl Content | (wt %) | 0.28 | 0.50 | 0.50 | 0.35 | 0.30 | 0.30 |
| β-OH | (mm$^{-1}$) | 0.30 | 0.05 | 0.11 | 0.35 | 0.40 | 0.40 |
| Pt Content | (ppm) | 0.09 | 0.15 | 0.15 | 0.11 | 0.10 | 0.06 |
| Rh Content | (ppm) | 0.16 | 0.17 | 0.17 | 0.16 | 0.16 | 0.07 |
| Pt + Rh Content | (ppm) | 0.25 | 0.32 | 0.32 | 0.27 | 0.26 | 0.13 |
| Surface area/volume | (cm$^{-1}$) | 0.07 | 0.07 | 0.07 | 0.07 | 0.07 | 0.07 |
| Bubble growth index I |  | 343 | 388 | 423 | 434 | 420 | 420 |
| Metal foreign object quality |  | A | A | A | A | A | A |
| Bubble quality |  | A | A | A | A | A | A |

In both of Exs. 7 and 8, the glass flow rate is 0.02 m$^3$/h and since the glass flow rate is low, the contact time between the molten glass and the molten glass-conveying pipe increases. Consequently, the elution amounts of Pt and Rh are likely to increase.

In Ex. 7 where the Cl content is 0.00 mass % and the Pt content is 0.30 ppm or less, Cl is not contained. Therefore, the elution amounts of Pt and Rh are reduced, and the metal foreign object quality is "A", but the bubble quality is "B".

In Ex. 8 where the Cl content is 0.26 mass % and the Pt content is more than 0.30 ppm, the Cl content satisfies the range of 0.10 to 0.50 mass %. Therefore, bubbles contained in molten glass can be sufficiently removed, and the bubble quality is "A", but the effect that the elution amounts of Pt and Rh increase due to the low glass flow rate cannot be eliminated, and the metal foreign object quality is "B".

In all of Exs. 9 to 13, the glass flow rate is 0.04 m$^3$/h and since the glass flow rate is larger than that in Exs. 7 and 8, the contact time between the molten glass and the molten glass-conveying pipe decreases. Consequently, the elution amounts of Pt and Rh are likely to decrease.

In Exs. 9 to 12 where the Cl content satisfies the range of 0.10 to 0.50 mass % and the Pt content satisfies the range of 0.001 to 0.30 ppm, both the metal foreign object quality and the bubble quality are "A".

In Ex. 9, the Cl content is small relative to Ex. 10, and this is a condition where bubbles are hard to grow in the vacuum refining vessel, but the glass temperature is raised so as to promote growth of bubbles in the vacuum refining vessel.

In Ex. 10, the Cl content is large relative to Ex. 9, and this is a condition where Pt and Rh tend to be eluted from the molten glass-conveying pipe, but the glass temperature is lowered so as to suppress elution of Pt and Rh.

In Ex. 11, the ratio of surface area to volume (surface area/volume) of the molten glass-conveying pipe is reduced relative to Ex. 10 so as to decrease the elution amounts of Pt and Rh. Therefore, compared with Ex. 10, the Pt content and the Rh content are small.

In Ex. 12, the Cl content is large relative to Ex. 9, and this is a condition where Pt and Rh tend to be eluted from the molten glass-conveying pipe, but the ratio of surface area to volume (surface area/volume) of the molten glass-conveying pipe is reduced so as to decrease the elution amounts of Pt and Rh. Therefore, compared with Ex. 9, the Pt content and the Rh content are small.

In Ex. 13 where the Cl content is 0.30 mass % and the Pt content is more than 0.30 ppm, the Cl content satisfies the range of 0.10 to 0.50 mass %. Therefore, bubbles contained in molten glass can be sufficiently removed, and the bubble quality is "A", but the effect that the elution amounts of Pt and Rh increase due to the low glass flow rate cannot be eliminated, and the metal foreign object quality is "B".

In all of Exs. 14 to 19, the glass flow rate is 0.65 m$^3$/h and since the glass flow rate is as large as 15 times or more that in Exs. 7 to 13, the contact time between the molten glass and the molten glass-conveying pipe decreases. Also, in Exs. 14 to 19, since the ratio of surface area to volume of the molten glass-conveying pipe is lower than that in Exs. 7 to 13, the contact area between the molten glass and the molten glass-conveying pipe decreases. Therefore, the elution amounts of Pt and Rh are decreased.

On the other hand, in Exs. 14 to 19, the time spent in passing of molten glass through the vacuum refining vessel is shortened and therefore, the molten glass is likely to pass through the vacuum refining vessel before bubbles contained in molten glass are caused to grow, float up and burst. Consequently, the percentage of defective products derived from bubble defects may increase in the inspection step.

In Exs. 14 to 19 where the Cl content satisfies the range of 0.10 to 0.50 mass % and the Pt content satisfies the range of 0.001 to 0.30 ppm, both the metal foreign object quality and the bubble quality are "A".

In Ex. 14 where the Cl content is 0.28 mass % and the Pt content is 0.30 ppm or less, the Cl content satisfies the range of 0.10 to 0.50 mass %. Therefore, the elution amounts of Pt and Rh can be prevented from increasing, resulting in that the metal foreign object quality is "A", and bubbles contained in molten glass can be sufficiently removed, resulting in that the bubble quality is "A".

In Ex. 15 where the Cl content is 0.50 mass % and the Pt content is 0.30 ppm or less, the Cl content satisfies the range of 0.10 to 0.50 mass %. Therefore, the elution amounts of Pt and Rh can be prevented from increasing, resulting in that the metal foreign object quality is "A", and bubbles contained in molten glass can be sufficiently removed, resulting in that the bubble quality is "A".

In Ex. 16 where the Cl content is 0.50 mass % and the Pt content is 0.30 ppm or less, the Cl content is larger than that in Ex. 14, and the β-OH is higher than that in Ex. 15. Therefore, in Ex. 16, bubbles contained in molten glass can be sufficiently removed relative to Exs. 14 and 15, and the bubble quality is "A".

In Ex. 17 where the Cl content is 0.35 mass % and the Pt content is 0.30 ppm or less and in Ex. 18 where the Cl content is 0.30 mass % and the Pt content is 0.30 ppm or less, the Cl content is small relative to Ex. 16. Therefore, the elution amounts of Pt and Rh are small, and compared with Ex. 16, the Pt content and the Rh content are small. In Exs. 17 and 18 there is a condition where the bubbles are hard to grow in the vacuum refining vessel compared with Ex. 16, but the β-OH is raised so as to promote the growth of bubbles in the vacuum refining vessel.

In Ex. 19 where the Cl content is 0.30 mass % and the Pt content is 0.30 ppm or less, the glass temperature is lowered relative to Ex. 18 so as to suppress elution of Pt or Rh. Therefore, compared with Ex. 18, the Pt content and the Rh content are small.

Incidentally, the present application is based on a Japanese patent application (Patent Application No. 2021-008661) which was filed on Jan. 22, 2021, and the contents of which are incorporated herein by reference.

100: Melting furnace
200: Upstream vertical pipe
210: Upstream horizontal pipe
220: Upstream horizontal pipe
300: Stirrer
400: Vacuum refining apparatus
410: Vacuum refining vessel
420: Uprising pipe
430: Downfalling pipe
440: Vacuum housing
500: Downstream vertical pipe
510: Downstream horizontal pipe
520: Downstream horizontal pipe
600: Stirrer
700: Forming apparatus
710: Bathtub
720: Lip
730: Tweel
G: Molten glass

What is claimed is:

1. A float glass substrate comprising an alkali-free glass, the float glass substrate having a Cl content of from 0.10 to 0.50 mass %, containing substantially no $SnO_2$, having a Pt content of, by mass, from 0.001 to 0.30 ppm, having a Rh content of, by mass, from 0.001 to 0.50 ppm, having a β-OH of from 0.05 to 0.50 $mm^{-1}$ and comprising, as represented by mass % based on oxides:
   from 54 to 73% of $SiO_2$;
   from 10.5 to 24% of $Al_2O_3$;
   from 0.1 to 12% of 8203;
   from 0 to 8% of MgO;
   from 0 to 14.5% of CaO;
   from 0 to 24% of SrO;
   from 0 to 13.5% of BaO; and
   from 0 to 5% of $ZrO_2$,
   provided that a total of MgO, CaO, SrO and BaO represented by MgO+CaQ+SrO+BaO is from 8 to 29.5%.

2. The float glass substrate according to claim 1, having a total content of the Pt content and the Rh content of, by mass, from 0.002 to 0.80 ppm.

3. The float glass substrate according to claim 1, comprising, as represented by mass % based on oxides:
   from 58 to 66% of $SiO_2$;
   from 15 to 22% of $Al_2O_3$;
   from 5 to 12% of $B_2O_3$;
   from 0 to 8% of MgO;
   from 0 to 9% of CaO;
   from 0 to 12.5% of SrO; and
   from 0 to 2% of BaO,
   provided that the total of MgO, CaO, SrO and BaO represented by MgO+CaO+SrO+BaO is from 9 to 18%.

4. The float glass substrate according to claim 1, comprising, as represented by mass % based on oxides:
   from 54 to 73% of $SiO_2$;
   from 10.5 to 22.5% of $Al_2O_3$;
   from 0.1 to 5.5% of $B_2O_3$;
   from 0 to 8% of MgO;
   from 0 to 9% of CaO;
   from 0 to 16% of SrO; and
   from 0 to 9% of BaO,
   provided that the total of MgO, CaO, SrO and BaO represented by MgO+CaO+SrO+BaO is from 8 to 26%.

5. The float glass substrate according to claim 1, having a Cl content of more than 0.35 mass % and 0.50 mass % or less and a β-OH of from 0.05 to 0.20 $mm^{-1}$.

6. The float glass substrate according to claim 1, having a Cl content of from 0.10 to 0.35 mass % and a β-OH of from 0.20 to 0.50 $mm^{-1}$.

7. The float glass substrate according to claim 1, having a strain point of 650° C. or more.

8. The float glass substrate according to claim 1, having a strain point of 680° C. or more.

9. The float glass substrate according to claim 1, having a substrate size of a short side of 2,100 mm or more and a long side of 2,400 mm or more.

10. The float glass substrate according to claim 1, having a substrate size of a short side of 2,900 mm or more and a long side of 3,200 mm or more.

11. The float glass substrate according to claim 1, having a plate thickness of 0.45 mm or less.

* * * * *